US009699401B1

(12) United States Patent
Jones (10) Patent No.: US 9,699,401 B1
(45) Date of Patent: Jul. 4, 2017

(54) PUBLIC ENCOUNTER MONITORING SYSTEM (71) Applicant: Jolanda Jones, Houston, TX (US)

(72) Inventor: Jolanda Jones, Houston, TX (US)

( * ) Notice: Subject to any disclaimer, the term of this patent is extended or adjusted under 35 U.S.C. 154(b) by 0 days.

(21) Appl. No.: 15/051,400

(22) Filed: Feb. 23, 2016

Related U.S. Application Data (60) Provisional application No. 62/135,762, filed on Mar. 20, 2015.

(51) Int. Cl.
*H04N 5/77* (2006.01)
*H04N 5/91* (2006.01)
(Continued)

(52) U.S. Cl.
CPC ............. *H04N 5/77* (2013.01); *G06T 11/206* (2013.01); *H04N 5/91* (2013.01);
(Continued)

(58) Field of Classification Search
CPC ........ H04N 5/77; H04N 5/91; H04N 21/4223; H04N 21/23109; H04N 21/2353; H04N 21/2743; G06T 11/206
(Continued)

(56) References Cited

U.S. PATENT DOCUMENTS 8,515,978 B2   8/2013   Kulkarni et al.
8,761,580 B2   6/2014   Gausereide
(Continued)

OTHER PUBLICATIONS

Elinor Mills, "ACLU App Lets Android Users Secretly Take the Police", CNET, Security, Jul. 5, 2012, 8 pgs. Retrieved on Feb. 22, 2016 from website: http://www.cnet.com/news/aclu-app-lets-android-users-secretly-tape-the-police.
(Continued)

*Primary Examiner* — Gelek W Topgyal
(74) *Attorney, Agent, or Firm* — Iselin Law PLLC (57) ABSTRACT A disclosed encounter monitoring method includes: receiving an alert from an encounter monitoring application executing on a first user's personal communications device; responsive to said alert, determining a location of the first user's personal communications device and proximity for personal communications devices of other users of the encounter monitoring application to the location; automatically sending to the personal communications devices of one or more users nearest to the location a request to approach the location and observe; collecting and storing a streamed recording from the first user's personal communications device and any streamed recordings from the personal communications devices of users complying with said request; associating encounter information with each recording, said encounter information including at least date, time, location, and any identified participants; grouping together those recordings relating to a common encounter; processing grouped encounter recordings and associated encounter information to associate each encounter with any participants that are official representatives of a government or institution; compiling, from the encounter information, incident statistics for at least one of: an official representative, a department, a jurisdiction, or a state; and reporting said incident statistics in tangible form to the first user.

20 Claims, 6 Drawing Sheets (51) Int. Cl.
  *H04N 21/4223* (2011.01)
  *H04N 21/2743* (2011.01)
  *H04N 21/231* (2011.01)
  *H04N 21/235* (2011.01)
  *G06T 11/20* (2006.01)

(52) U.S. Cl.
  CPC ... *H04N 21/2353* (2013.01); *H04N 21/23109* (2013.01); *H04N 21/2743* (2013.01); *H04N 21/4223* (2013.01)

(58) Field of Classification Search
  USPC .......................................................... 348/143
  See application file for complete search history.

(56) References Cited

U.S. PATENT DOCUMENTS

| | | | | |
|---|---|---|---|---|
| 9,462,028 | B1* | 10/2016 | Levinson | H04L 65/602 |
| 2003/0081935 | A1* | 5/2003 | Kirmuss | H04N 7/18 |
| | | | | 386/327 |
| 2003/0151663 | A1* | 8/2003 | Lorenzetti | H04N 7/18 |
| | | | | 348/148 |
| 2004/0233281 | A1 | 11/2004 | Tolmei | |
| 2006/0176369 | A1* | 8/2006 | Meritt | G08B 13/19621 |
| | | | | 348/143 |
| 2008/0014947 | A1* | 1/2008 | Carnall | G08B 21/22 |
| | | | | 455/437 |
| 2009/0028517 | A1 | 1/2009 | Shen et al. | |
| 2009/0119729 | A1 | 5/2009 | Periman et al. | |
| 2012/0275391 | A1* | 11/2012 | Cui | H04W 72/1247 |
| | | | | 370/329 |
| 2013/0007788 | A1 | 1/2013 | Levinson et al. | |
| 2013/0104177 | A1 | 4/2013 | Kwan et al. | |
| 2013/0183924 | A1* | 7/2013 | Saigh | H04W 4/025 |
| | | | | 455/404.2 |
| 2013/0325943 | A1* | 12/2013 | Al-Harthi | G06Q 50/01 |
| | | | | 709/204 |
| 2013/0325970 | A1 | 12/2013 | Roberts et al. | |
| 2014/0112633 | A1 | 4/2014 | Tan | |
| 2014/0139660 | A1 | 5/2014 | Zhu et al. | |
| 2014/0192199 | A1 | 7/2014 | Tan et al. | |
| 2014/0269482 | A1* | 9/2014 | Pandey | H04W 4/06 |
| | | | | 370/312 |
| 2016/0027292 | A1* | 1/2016 | Kerning | G08B 25/10 |
| | | | | 455/404.2 |

OTHER PUBLICATIONS

New York Civil Liberties Union (NYCLU), "Stop and Frisk Watch App", American Civil Liberties Union of New York State, 2 pgs., Retrieved on Feb. 22, 2016 from website: http://www.nyclu.org/app.

* cited by examiner

PUBLIC ENCOUNTER MONITORING SYSTEM

PRIOR RELATED APPLICATIONS

This application claims priority to U.S. Ser. No. 62/119,439 filed Feb. 23, 2015 and 62/135,762 filed Mar. 20, 2015, each of which are incorporated by reference herein in their entireties for all purposes.

FEDERALLY SPONSORED RESEARCH STATEMENT

Not applicable.

FIELD OF THE DISCLOSURE

This disclosure relates to a system for monitoring encounters of police officers or other individuals with the public.

BACKGROUND OF THE DISCLOSURE

Racial profiling, abuse by police and other government officials are a fact of life in the Unites States today, and the problem can be much more severe outside the US in dictatorial countries with oppressive regimes.

No one is immune, and many young black males will attest to instances of profiling and harassment because of their color. Even police officers themselves are not immune. Reuters interviewed 25 African American male officers on the New York Police Department and all but one said that, when off duty and out of uniform, they had been victims of racial profiling, which refers to using race or ethnicity as grounds for suspecting someone of having committed a crime. Further, Latino males have the same complaints as African Americans. Since 911, the difficulty is not restricted to African Americans and Latinos, either, and people of Middle Eastern decent have increasingly been targeted for additional scrutiny.

The inventor believes that transparency is the way to curb such abuses—and one way to obtain transparency is to record all police encounters, keeping a record for court use in the event that an unlawful or unnecessary detention and/or arrest is made and/or deadly force is used. Indeed, the First Circuit Court of Appeals unanimously ruled that a citizen has a "constitutionally protected right to videotape police carrying out their duties in public." In at least 38 states, the law allows citizens to record police, as long as the citizen does not physically interfere with police work. However, the police might still unfairly harass a citizen, detain him or her, and confiscate the camera, eliminating any such evidence.

Thus, there is a need in the art for an encounter monitoring system that is fast, not susceptible to illegal confiscation and destruction, and that provides some kind of emergency response system when needed. Furthermore, the ideal system would be able to mine the vast amounts of data collected and provide more extensive reports on individual behavior, as well as compare behavior patterns across department, states lines, even from country to country.

SUMMARY OF THE DISCLOSURE

Accordingly, this disclosure provides an encounter monitoring system that can receive recordings and associated information from thousands of citizens on a real time basis, correlate that information with data available under the Freedom of Information Act (FOIA), and be able to associate the data into reports on particular government officials to determine if a pattern of abuse is ongoing or if a particular jurisdiction has a systemic issue. Although we exemplify the system herein with respect to law officials, the system is not so limited, and can be used to survey any organization with a public presence, such as fire departments, EMS personnel, military or quasi-military forces, and government officials of all kinds. In addition, even though envisioned for use in tracking official behavior, the system will be very useful in public tracking of all criminal activity as well.

Citizens commonly possess personal communications devices such as programmable mobile phones (including "smart" phones) and other mobile recording devices, which can employ applications ("apps") to communicate wirelessly via satellite networks, cellular data networks, wireless local area networks ("wifi"), and/or personal area networks (e.g., Bluetooth) with base stations that in turn are networked with the data processing centers that embody cloud computing services and databases. As the intermediate links are hidden from the user, however, the apps enable the personal communications devices to appear directly connected with cloud-based services, including the backend systems discussed herein. Thus any audio, visual, or video recordings captured by the encounter monitoring apps disclosed herein can be immediately uploaded or streamed to the backend systems, where they are received and stored on a secure database server, along with the date, time, and GPS coordinates for the location where the recordings were captured. The implementation of the backend systems with cloud-based services enables the systems to be highly distributed with built-in redundancy to protect the data against localized physical attacks. Moreover, the recordings and associated data may be provided with a checksum, digital watermark, or other mechanism to protect against tampering and provide an authenticity guarantee. The recordings and associated data may further be encrypted to protect against interception and other forms of unauthorized access. Firewalls, password protection, and other access control mechanisms may also be employed to limit and monitor access to the secure database. Alone or in combination, these features make the information tamper-resistant, and provide protection against confiscation or destruction of the camera.

Apps and cloud-based services are already available for real-time uploading of data and readily adaptable to the purposes set forth herein. However, existing upload and streaming systems lack the backend systems and features disclosed herein to fully utilize such data. At least some embodiments of the disclosed encounter monitoring system have a backend system that can analyze the data and extract identifying information about the recorded encounters, such information including date, time, location, type of encounter, weapons brandished, weapons used, voice recognition, facial recognition, transcription of audio, stabilization of video, noise reduction of audio, extraction of badge number, license plate number, car number, speed of the personal communications device or passing vehicles, and the like.

Moreover, the backend system may include a database of personnel data for, e.g., local police departments and emergency services providers, as such data is largely available to the public, e.g., via the FOIA. Each official will have a file, with all identifying information therein, as well as any incidents relating to said official. To the extent that such information is not preloaded, it can be collected over time as more and more recordings are uploaded to the backend system. The backend system software examines the uploaded visual and auditory recordings and automatically extracts identifying information. Such information includes, e.g., badge numbers, license plate numbers, car numbers, spoken or written names, and the like. Additionally, the backend system will identify faces, using facial recognition cues and checks against a growing database of faces in the files for each official. Voice recognition can also be done to identify an individual based thereon.

The extracted data is then placed into or correlated with the appropriate official's files, and based thereon data can be compiled over time, reports prepared and printed or displayed for a user. Officials are also grouped by jurisdiction, and by department within a jurisdiction, by state, by country, and the like. In this way, one can determine for example, if the NYPD or a South American government has systemic issues relating to inappropriate behavior, and the effectiveness of actions taken to mitigate the problem internally or otherwise.

In addition to securely storing and processing of real-time encounter recordings, the system will facilitate the filing of official complaints. Thus, a victim, an emergency contact or community responder can all access the data and have the backend system prepare a complaint for filing in egregious situations. Additionally, the backend system can automatically forward the complaint to either the official or department in question, optionally in the form of an Internal Affairs Complaint and, in particularly egregious cases, automatically file a complete encounter report with the Justice Department.

In order to automate some of the reporting functions, the backend system may apply a score to certain behavior, e.g., on a scale of 1-5 or 1-10. The score is preferably derived in at least in part by processing of the recording data, but may also be based on user responses to a post-encounter survey. The backend system is thus able to evaluate the significance of the encounters and need not report minor issues, but only those encounters having an incident severity in excess of some threshold, to e.g., department heads and/or watchdog groups, and for egregious systemic issues, for example, can report to the appropriate enforcement agency and/or press. To prevent abuse, the encounter monitoring system is in some embodiments configured to withhold the link or option for filing a complaint until the score indicates a sufficiently high incident severity. The threshold may be modulated to account for real behavioral patterns.

For a very powerful system, census data can be incorporated into the database, and reports also correlated with e.g., socioeconomic status and/or racial makeup of a neighborhood, and the like. Such reports are expected to be very useful e.g., to law enforcement, civil liberties organizations, lawyers, and individual defendants. For example, an officer may compile reports about the number and severity of criminal incidents in a neighborhood to justify a particular action in that neighborhood. Law enforcement data can also be incorporated into the database. However, in such event, data relating to ongoing cases would need to be designated as such, since such data is typically not available to the public until a case is closed, except under certain defined circumstances.

The encounter monitoring app that executes on a user's personal communications device may at times be referred to herein as the "5-O Watch" (five oh watch) app. In at least some embodiments, the encounter monitoring app initiates real-time capture and streaming of a recording to the backend system immediately upon being launched. Since real time data uploading is very bandwidth intensive, it is expected that compression technology will be used, however, in the event that bandwidth is a limited issue, the encounter monitoring app may upload, e.g., every other frame, every third frame, etc., while attempting to retain the highest quality audio.

The encounter monitoring app may further provide, optionally on every screen it displays, a panic button that can be touch or voice activated to send an alert to the backend system. In at least some embodiments, the encounter monitoring app and/or the backend system is further configured to detect emergency conditions and to provide an automatic alert without requiring touch or voice activation of the panic button. Such automatic alerts may be provided, e.g., when the encounter monitoring app or backend system detect shots fired, screams, injuries, violent shaking of the device, or other characteristics of violent action.

The alert initiates two actions: notification of a designated emergency contact; and notification of nearby users. In some embodiments, the alert may be provided with an optional time delay so that the user has the option of canceling the alert before the notifications occur. This optional delay may be employed where the user suspects imminent trouble will occur at a time or location where the wireless network (or their personal communications device) is inaccessible. If the time delay expires without cancelation of the alert, the notifications occur automatically, ensuring the user is still protected if they cannot access their phone during an encounter.

The alert causes the backend system to contact one or more designated emergency contacts for the user, and to provide any uploaded information along with the streamed recording to the designated emergency contact(s) as well. Thus, the designated emergency contact(s) can take appropriate actions to mitigate the danger. This feature is expected to be particularly useful in countries where the "disappearing" or kidnapping of victims is an endemic problem.

The alert further causes the backend system to contact nearby users of the encounter monitoring app with a request to approach the location of the encounter and observe. This request may at times be referred to herein as a "notification" or a "5-O Alert" (five oh alert). The contacted users may choose to travel towards the scene and record the encounter, thus providing additional real time information and recordings of the situation. Ideally, 5-O Watch app users within a block or two, or within one or a few miles will receive the 5-O Alert and respond or not, as they choose. In some embodiments, the backend systems provide the contacted users with a photo of the person initiating the 5-O Alert, so they know who they are looking for. In other embodiments, the contacted user may be provided with the same real time information and streamed recording that is being uploaded, or a portion thereof.

In some embodiments of the encounter monitoring system, the backend server will identify the emergency location when a panic button is activated and will query the personal communications devices of users, e.g., in a particular city, to see who is within a designated range, e.g., 1, 2, 5 or 10 miles. Those users that are shown to be within a suitable distance are notified with the request to approach and observe. Further, the designated range can be modulated to account for real time population density, estimated travel time, or similar factors.

Another proximity determination mechanism that may be employed is "areas of interest". On downloading or otherwise creating an account for use with the encounter monitoring app, the users may designate their areas of interest, which may correspond to their areas of employment, residence, and shopping. The users may designate areas of interest, for example, by using a map application and feature that allows the dropping of pins, such as is used to designate approximate locations in Craig's list. (In that way, the user need not provide a great deal of personal information to the backend servers.) The "nearby" users are those having an area of interest within which the encounter location falls.

In some contemplated embodiments of the encounter monitoring system, the notifications are not limited to nearby users, but are additionally or alternatively sent to nearby residents via public alert systems such as the U.S.'s Emergency Alert System, Reverse 911, or other emergency notification systems in the same fashion as AMBER Alerts and Silver Alerts.

The contacted users or residents that decide to respond to a notification can indicate that they intend to do so, or alternatively they may approach the location and launch the app to initiate capture and streaming of additional encounter recordings. The backend system may use these responses, alone or in combination with the associated date, time, and location information, to group all recordings of a given encounter. Alternatively, the backend systems may group uploaded encounter recordings and information from the same time and general location.

In at least some embodiments, the activation of the panic button further initiates an override mode, wherein the recording cannot be stopped without entering a reset code. Nevertheless, attempts to stop the recording without entering the proper code may cause the device to stop displaying video and thus make it appear that the recording has stopped. To prevent this safety measure from requiring excessive streaming and storage of unnecessary recording data, the encounter monitoring app may periodically inform or remind the user that the override mode is active and ask if the user would like to turn it off. The user may then elect to enter the appropriate code to turn off the capture and streaming of further recording data to the backend system. By contrast, if an emergency code is entered, the periodic reminders are deactivated and the encounter monitoring system continues to capture and stream recording data to the backend system for as long as the personal communications device is able to do so (or if the proper code is entered).

The encounter monitoring app may enable the use of peripheral devices, such as Bluetooth cameras and Bluetooth microphones, for capturing the recording data. Such peripherals may be more easily carried, and perhaps less obvious, when used for encounter monitoring. Such cameras are commercially available in discreet forms such as watches, glasses or pens. Further, a camera can be set up in e.g., a car window or other suitable location.

In at least some embodiments, the backend system may be given access to recordings from other sources, such as house cameras, car cameras, cameras mounted on street corners or in neighborhoods with endemic violence, etc. The backend system may be configured to accept manual uploads of files retrieved from such devices. Alternatively, where such recording devices are coupled to the Internet or some other accessible communications network, the backend system can be provided with the necessary contact information to retrieve selected recordings automatically or to obtain and store continuous recording streams from the recording devices. Thus, the data record can become nearly continuous, monitoring all public spaces. This capability, however, may require considerable storage requirements, as well as particularly effective data extraction methods, and may be omitted from the first releases.

After an encounter, the participating users can log into the system via mobile device or stand alone computer and review or obtain copies of all encounter data. (In certain contemplated embodiments, this access will be via a 5-O Watch web page.) Thus, in the event that legal action is needed, a user may log in and request authenticated copies of all recorded encounter data for a fee. This can be one point of monetization for the system. Further, if desired, the users can query the encounter monitoring system to provide a variety of reports, e.g., about the officials in question, about activities in one neighborhood versus another, activities on a department or jurisdictional basis, and the like.

In at least some embodiments, the backend system groups all recordings of a given incident, including the users providing the recordings as identified participants in addition to those participants that are identified via processing of the recordings and via correlation with other database information. Thus, even in situations where police officers have failed to identify themselves or declined to promptly identify and disclose witnesses, the encounter monitoring system is able to report, at a user's behest, the identities of the officers and likely witnesses to the encounter. Moreover, the encounter monitoring system may further include histories for each of the participants, insofar as they have been associated with previous encounters or information documented in the databases accessible to the system. Such information may be indicative of the credibility of the various potential witnesses should they be needed at trial.

In the event that an encounter is very minor or receives a very low incident severity score, e.g., because the recording is initiated immediately on being approached by an officer and "nothing happened", there may be no need to retain the data. In this case, the encounter monitoring system can query the user some time (e.g., 24-48 hrs.) after the encounter and ask them if the data should be retained or not. Thus, the system can begin to cull non-relevant recordings. Of course, a user pin or password would be required to request deletion, and if the user enters instead an emergency code (e.g., EMERGENCY), the system would retain all data, optionally without so informing this user. Thus, if the user were being detained and was required by an official to enter a pin for deletion, he could appear to do so, and the official would be none the wiser.

In at least some contemplated embodiments, the encounter monitoring application is equipped with the needed algorithms to encrypt the users phone, making the entirety of phone data more secure, accessible, e.g., only through pin number, voice recognition, iris reading technology, fingerprint reading technology, and the like.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOMENCLATURE

"App" is an abbreviation for application. GPS is an acronym for Global Positioning System. FOIA is an acronym for Freedom of Information Act.

As used herein, a "controlling agency" is that agency, typically but not necessarily a government agency, designated to be responsible for the conduct of an encounter. As used herein "incident severity" is a ranking system based on e.g., violence, the sound of gunshots, the presence or brandishing of weapons, physical altercations, shouting, foul language, and the like. However, other qualifiers can be used. The term "nearby users" means users within a reasonable response time range, and the distance may vary depending on the density of users in the area. Thus, nearby users maybe within a few blocks in a crowded city, but may be within a few miles in a less dense regions, such as the suburbs or on a highway.

The use of the word "a" or "an" when used in conjunction with the term "comprising" in the claims or the specification means one or more than one, unless the context dictates otherwise. The term "about" means the stated value plus or minus the margin of error of measurement or plus or minus 10% if no method of measurement is indicated. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

DESCRIPTION OF EMBODIMENTS OF THE DISCLOSURE

The disclosure provides an encounter monitoring system that includes public input including various audio and visual recordings to a database in real time, thus, the data will then be available for crime solving and justice needs. The present disclosure is exemplified with respect to police departments. However, this is exemplary only, and the disclosure can be broadly applied to any public crime, disappearances, kidnappings, any government or public interaction. Further, although the system was invented to specifically address racial profiling and police abuse, it can equally be used to solve crimes and catch perpetrators. The following examples are intended to be illustrative only, and not unduly limit the scope of the appended claims.

Figure 1:
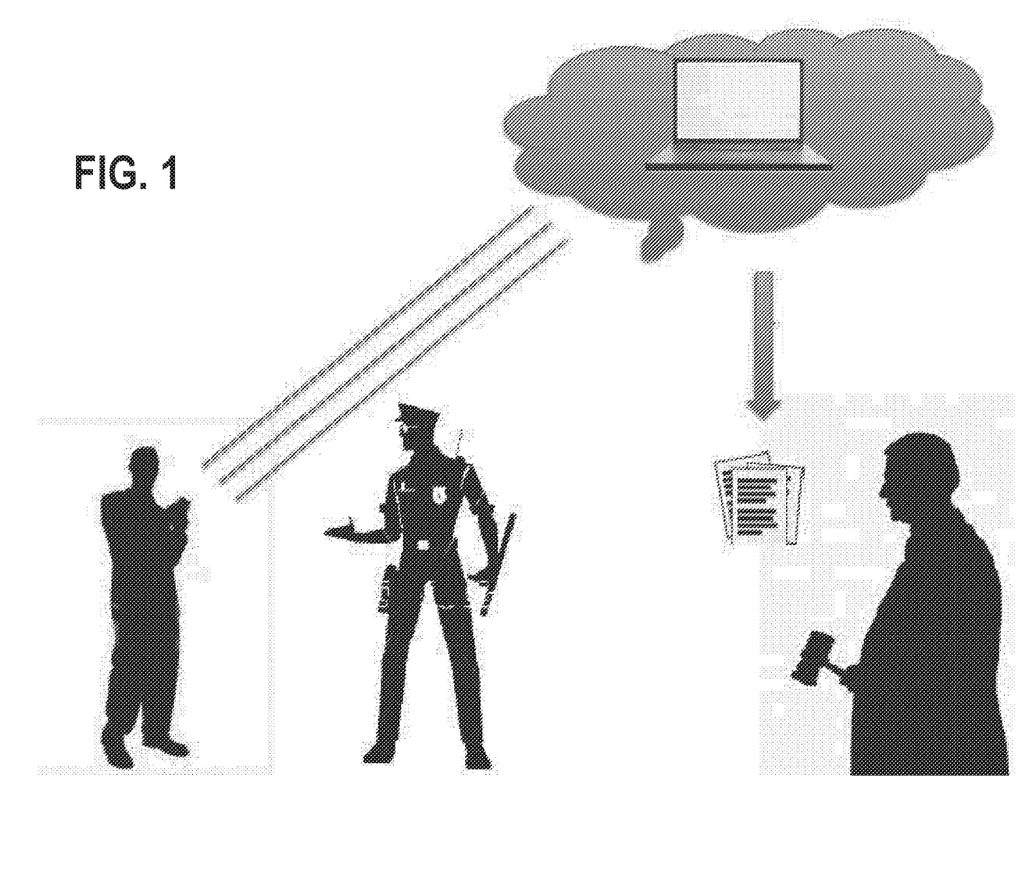
FIG. 1 is a concept diagram of an illustrative encounter monitoring system.

FIG. 1 shows the basic idea of the encounter monitoring system conceptually, wherein a citizen with a cell phone or other mobile device has an app loaded thereon, herein referred to as the "5-O Watch" app. The citizen launches the app and records any unusual encounter, be it a crime in progress or abuse by a public official, or even a fight with a spouse or neighbor. This recording data is transmitted in real time to a secure backend server, preferably a cloud based server, for storage, along with time, date and GPS data indicating a location where the recording is acquired. The data is thus available for later retrieval and use, e.g., to solve crimes, exonerate an arrestee, and the like. The backend system organizes and processes the recordings and associated encounter data to facilitate its usage and to document patterns of conduct.

Figure 2:
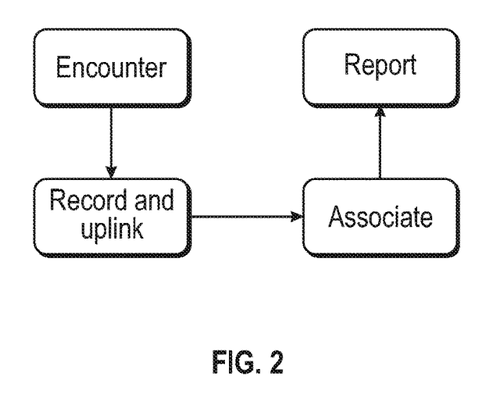
FIG. 2 is a schematic overview of an illustrative encounter monitoring process.

FIG. 2 shows a flow chart of the basic system in some additional detail, wherein an encounter of some type occurs, and is recorded. The 5-O Watch app streams that data as it is recorded to a secure database for later use. In a preferred embodiment, the backend system analyzes the data and associates it with related data, e.g., video of the same encounter recorded by another citizen, or data about one or more people or cars, or other items in the recording. By associating these various data together, a more complete understanding of the encounter can be obtained. In a final step, an incident report may be prepared and transmitted to the user, a government official, a watchdog organization, a court of law, the press or even the police and fire or other emergency response personnel.

It is important that the system be tamper proof, such that time date and place tags cannot be tampered with and so that recordings cannot be altered. At the same time, data will be extracted, pictures may be sharpened and clarified or zoomed or cropped, and audio may be subject to noise reducing algorithms, video stabilization algorithms, and the like. Thus, the system should track and retain every change in the data in a secure fashion. Thus, the reports would meet even the most rigorous evidentiary standards.

Figure 3:
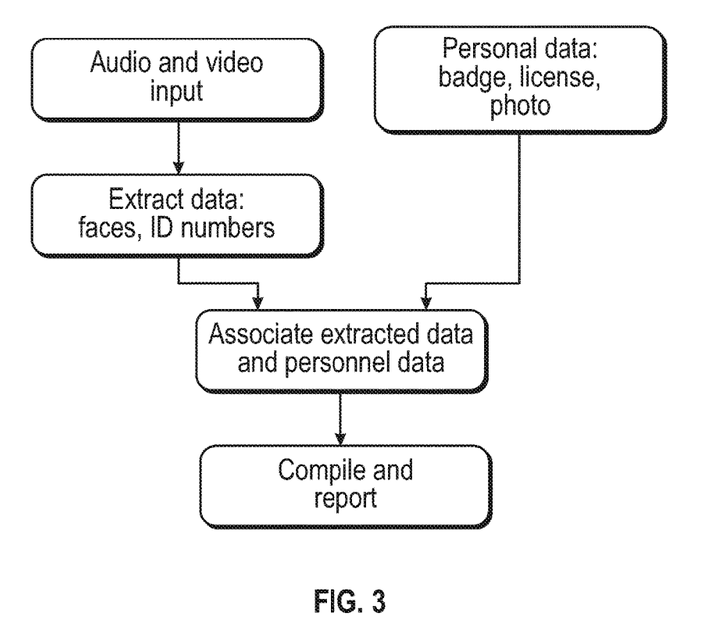
FIG. 3 is a schematic of illustrative data inputs, extractions, associations, and outputs.

In a preferred embodiment, shown in FIG. 3, the database is prepopulated with data about e.g., government officials, census information, police reports, and the like, which should be available under the FOIA. An officer's name, badge, photo, license plate, car number and the like can all be included in the database where available. Similarly, the same system could be used for monitoring encounters with individuals engaging in criminal conduct, assuming the appropriate constitutional protections are made. However, the remainder of this example will focus on law enforcement officers.

The backend system then analyzes the uploaded data and extracts information therefrom. For example, faces can be extracted and compared with a database of facial photographs and a likelihood of identification assigned thereto. Likewise, license plate, car and badge numbers can be extracted from and added to the extracted data record. Other data that can be extracted include location, time, and the like. Such information may be correlated with the patrol personnel assignments to further aid in identification of encounter participants. The type of encounter can also be determined, e.g., gunshots can be identified, physical altercations, oral abuse, and the like, and can all be extracted from the data.

The extracted data from an encounter can be compared with all other data on the system, and related data associated together. For example, all other encounters involving a certain law enforcement officer can be collated and analyzed to detect patterns of conduct.

Figure 4:
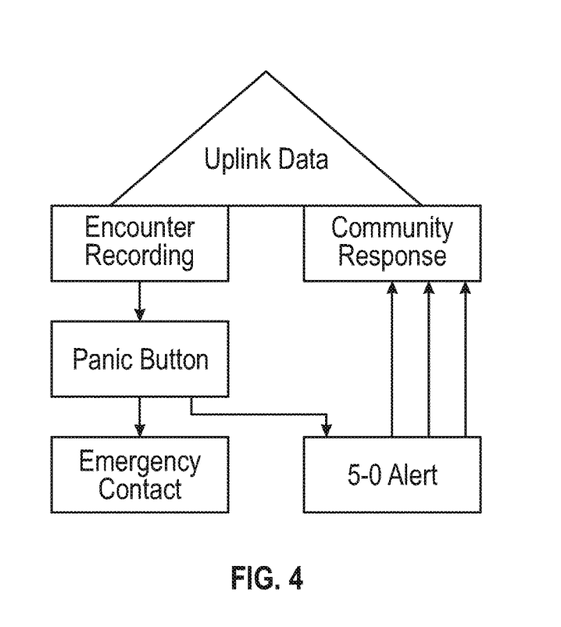
FIG. 4 shows an alternative system embodiment having "panic button" for providing 5-O Watch community and emergency contact alerts.

FIG. 4 shows a preferred embodiment of the encounter monitoring system, where every page of the app has a panic button thereon that can be voice or touch activated. Once activated, a variety of responses can be made. For example, the system can stream data directly to an emergency contact or 911, thus an appropriate emergency response initiated. At the same time, a "5-O Alert" can be passed to the nearest available app users so that a community response can be mounted, by e.g., assisting a crime victim or by recording the encounter from other angles. Like the original data, this data too is immediately uploaded to the database in real or near real time.

As noted above, an alert can be set up to autoactivate in the event shots are detected or if the user fails to deactivate the system in time, or if an emergency code is used instead of the password to deactivate the autoalert.

Furthermore, alert data can be coded as to danger levels. For example, if shots are detected, nearby users may be warned thereof, and perhaps told to not leave their cars or to even avoid approaching the encounter too closely.

Figure 5:
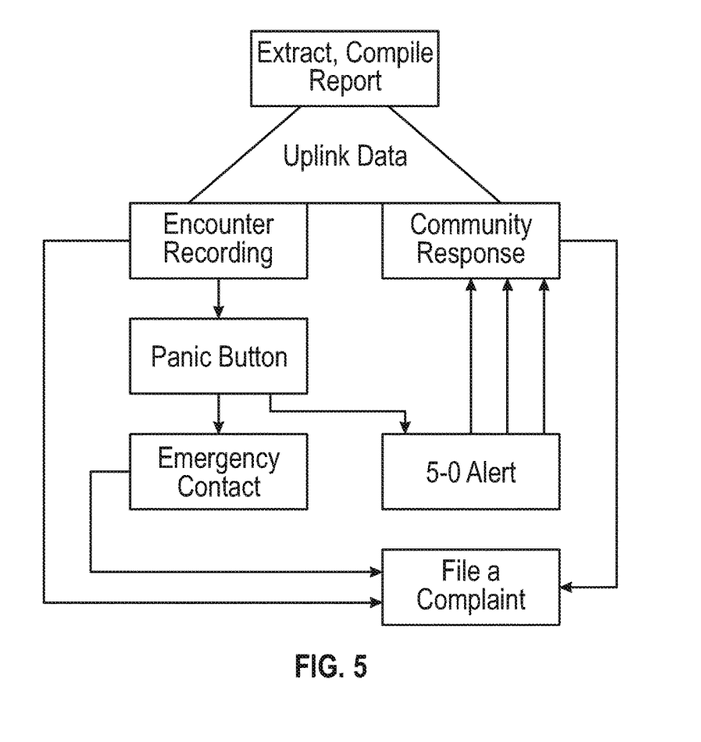
FIG. 5 shows an alternative system embodiment with the ability to file a complaint by any one exposed to a given reportable incident.

FIG. 5 shows yet another embodiment, wherein a complaint link is provided to users of the system. In some embodiments, the complaint icon is only provided when the encounter reaches a threshold level of seriousness, such that frivolous complaints are not filed. Further, different agencies have different requirements for Internal Affairs Complaints, thus this may be altered based on GPS coordinates of the encounter. In some embodiments, the threshold can be overridden by the user taking some additional action, e.g., reporting to the system administrator and requesting an exception for the threshold requirement.

Figure 6:
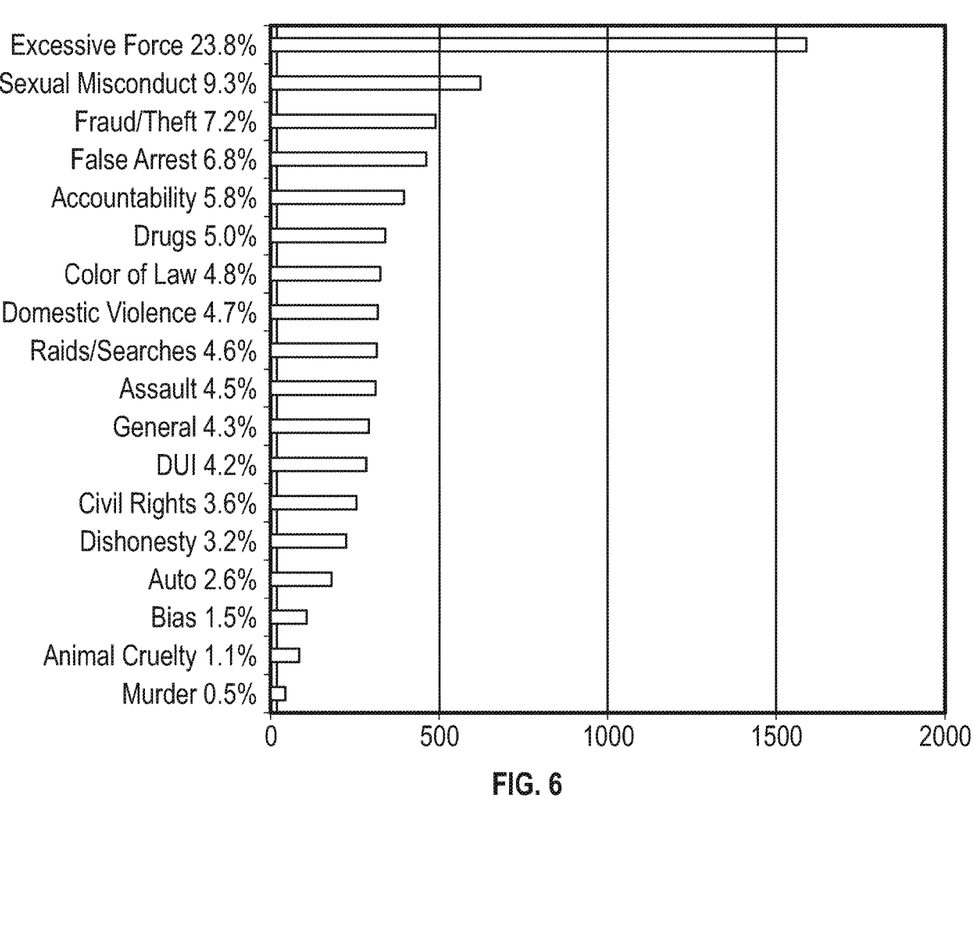
FIG. 6 is an exemplary city incident report, broken down by type of incidence reported.
Figure 7:
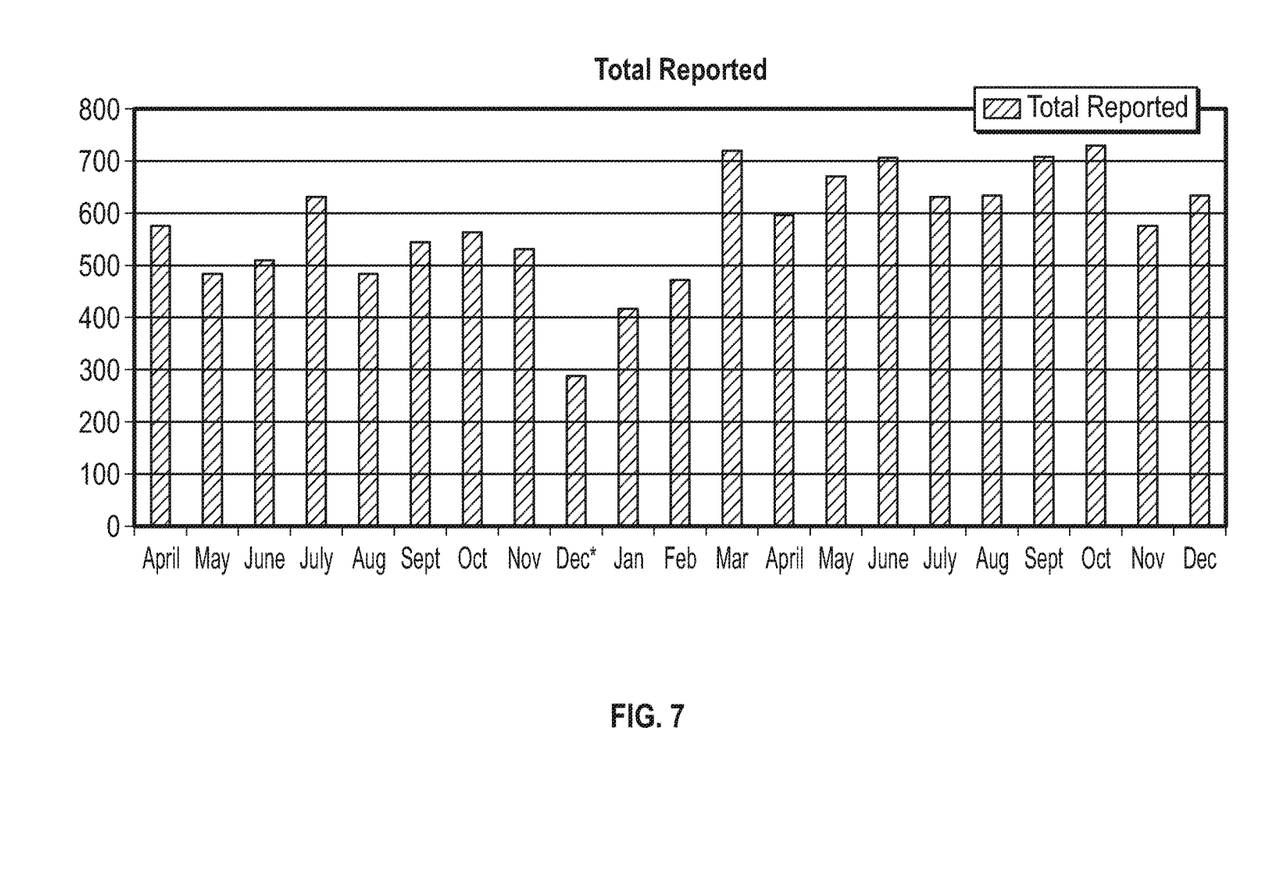
FIG. 7 shows the number of reports for a given department over a year's time.
Figure 8:
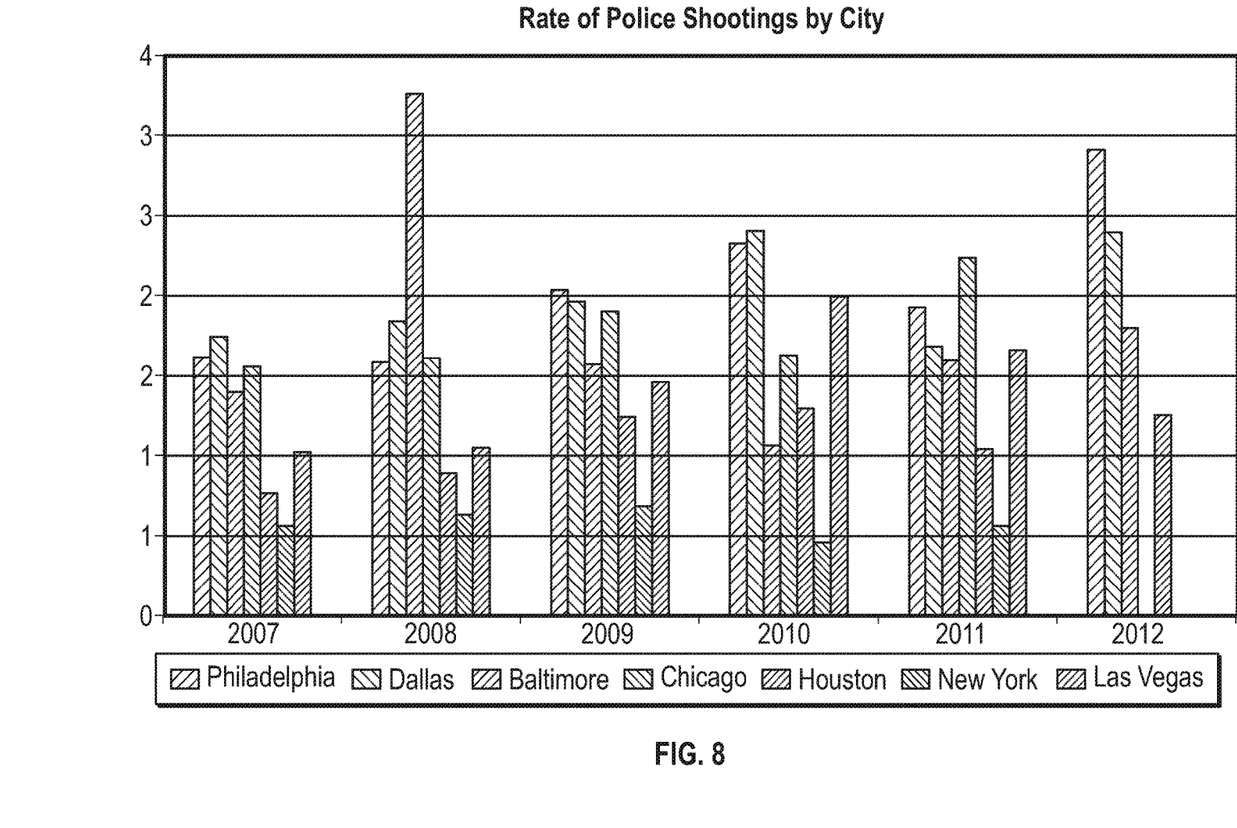
FIG. 8 compares incident reports between certain cities.

Reports can be generated by the system on a variety of bases, including but not limited to incident reports, officer reports, department, agency, or city reports, state wide reports, type of incidence reports, number of reported incidents over time, and the like. See e.g., FIG. 6-8. These reports are exemplary only as different agencies have different requirements.

Reports may be transferred automatically to the citizen recording the data, and this can be sent e.g., via email or email link, but it is anticipated that reports will be provided only on request and payment of a fee. Compiled reports about a particular officer may be collected over time, and if warranted, sent to a department administrator or head. Reports can also be compiled about a particular department, and compared to other departments in similar sized cities, to determine if a city has a systemic issue in their law enforcement agencies. Reports can be provided by type of encounter. Reports can also be de-identified, and simply provide a record of the number of reported incidents over time. As with complaints, the reports can be withheld until a threshold level of seriousness is reached, thus not overwhelming agencies with unneeded data.

In other embodiments, the data is merely stored and available for use should it be needed at a later time, e.g., in a court of law. As noted above, however, often a user may begin recording data, but then nothing untoward happens. Thus, the event doesn't rise to the level of needing to retain the recording. Preferably, the system will query the user after a period of time, and if the correct pin is entered, the user may elect to delete the data. The system may elect to delete the date after a certain time has passed, e.g., 24 hrs or weekly, and/or may override the delete request, if the system detects a severe incident, e.g., shots fired, emergency code detected and the like.

The following references are incorporated by reference in their entirety for all purposes. In particular, these references enable various individual features of the disclosed encounter monitoring system, including capture and streaming of recordings, the use of cloud-based systems for secure storage and distributed processing, analysis of recordings to extract numbers, faces, and so forth.

US20140139660 Method and apparatus for detecting people by a surveillance system US20040233281 Visual and audible surveillance system, using CATV cable plant distribution equipment, that enables the public to monitor, on television receivers, "at risk" areas or facilities 24 hours per day 7 days per week US20140112633 Method and system for network-based real-time video display US20140192199 Mobile computing device having video-in-video real-time US20130104177 Distributed real-time video processing US20130325970 Collaborative video application for remote servicing U.S. Pat. No. 8,515,978 Method of interactive video blogging U.S. Pat. No. 8,761,580 Real time video inclusion system US20090028517 Real-time near duplicate video clip detection method US20090119729 Method for multicasting views of real-time streaming US20130007788 System and method for real time video streaming from a mobile device or other sources through a server to a designated group and to enable responses from those recipients.

What is claimed is:

1. An encounter monitoring method that comprises:
   receiving an alert from an encounter monitoring application executing on a first user's personal communications device;
   responsive to said alert, determining a location of the first user's personal communications device and proximity for personal communications devices of other users of the encounter monitoring application to the location;
   automatically sending to the personal communications devices of one or more users nearest to the location a request to approach the location and observe;
   collecting and storing a streamed recording from the first user's personal communications device and any streamed recordings from the personal communications devices of users complying with said request;
   associating encounter information with each recording, said encounter information including at least date, time, location, and any identified participants;
   grouping together those recordings relating to a common encounter;
   processing grouped encounter recordings and associated encounter information to associate each encounter with any participants that are official representatives of a government or institution;
   compiling, from the encounter information, incident statistics for at least one of: an official representative, a department, a jurisdiction, or a state; and
   reporting said incident statistics in tangible form to the first user.

2. The method of claim 1, further comprising:
   receiving a response to said request, the response indicating an responder's intent to approach the location and observe; and
   including the responder as an identified participant for the encounter.

3. The method of claim 1, wherein said processing includes at least one of performing facial recognition and performing voice recognition.

4. The method of claim 1, wherein said processing includes video processing to extract a car number, license plate, or badge number.

5. The method of claim 1, wherein said processing includes at least one of: correlating encounter information with a database of personnel assignments; and filing a freedom of information act request for identities of said official representatives.

6. The method of claim 1, further comprising analyzing the grouped recordings to determine an incident severity.

7. The method of claim 6, wherein said analyzing includes detecting whether the recordings indicate at least one of: shouting, violent shock, and gunfire.

8. The method of claim 6, further comprising: automatically providing a complaint link to a controlling agency for those encounters having an incident severity that exceeds a threshold.

9. The method of claim 8, wherein the threshold depends in part on previous incident statistics for official representatives associated with the encounter.

10. The method of claim 1, wherein said storing includes archiving the recordings in a tamper-resistant fashion.

11. An encounter monitoring system that comprises:
an encounter monitoring application that runs on personal communications devices of users; and
one or more backend servers running backend software, the software causing the one or more backend servers to monitor encounters by:
receiving an alert from the encounter monitoring application running on one of the personal communications devices ("first PCD");
responsive to said alert, determining a location of the first PCD and proximity of other ones of the personal communication devices ("other PCDs") to the location;
automatically sending to the other PCDs nearest to the location a request to approach the location and observe;
collecting and storing a streamed recording from the first PCD and any streamed recordings from said other PCD's nearest to the location whose users have complied with said request;
associating encounter information with each recording, said encounter information including at least date, time, location, and any identified participants;
grouping together those recordings relating to a common encounter;
processing grouped encounter recordings and associated encounter information to associate each encounter with any participants that are official representatives of a government or institution;
compiling, from the encounter information, incident statistics for at least one of: an official representative, a department, a jurisdiction, or a state; and
reporting said incident statistics in tangible form.

12. The system of claim 11, wherein the encounter monitoring application includes a panic feature that can be voice or touch activated by a user, said panic feature transmitting said alert to the one or more backend servers upon activation.

13. The system of claim 11, wherein as part of said encounter monitoring, the software further causes the one or more backend servers to receive one or more responses to said request, said response indicating whether a user intends to approach the location and observe.

14. The system of claim 11, wherein as part of said storing, the software causes the one or more backend servers to archive the recordings in a tamper-resistant fashion.

15. The system of claim 11, wherein as part of said processing, the software causes the one or more backend servers to perform at least one of: facial recognition, voice recognition, extraction of a car number, license plate number, and badge number.

16. The system of claim 11, wherein as part of said processing, the software causes the one or more backend servers to correlate encounter information with a database of personnel assignments.

17. The system of claim 11, wherein the software further causes the one or more backend servers to analyze the grouped recordings to determine an incident severity and to automatically prepare a report for those encounters having an incident severity in excess of a predetermined threshold.

18. The system of claim 11, wherein the backend software accounts for population density of the location when determining proximity.

19. The system of claim 11, wherein the backend software determines proximity based in part on whether the location is within user-selected regions of interest.

20. An encounter monitoring method that comprises:
receiving an alert from an encounter monitoring application executing on a first user's personal communications device;
responsive to said alert, determining a location of the first user's personal communications device and proximity for personal communications devices of other users of the encounter monitoring application to the location;
automatically sending to the personal communications devices of one or more users nearest to the location a request to approach the location and observe;
collecting and storing a streamed recording from the first user's personal communications device and any streamed recordings from the personal communications devices of users complying with said request;
associating encounter information with each recording, said encounter information including at least date, time, and location;
grouping together those recordings relating to a common encounter;
processing grouped encounter recordings and associated encounter information to identify participants;
compiling encounter statistics for at least one of the identified participants; and
reporting said incident statistics in tangible form.

* * * * *